United States Patent [19]
Yoshida et al.

[11] Patent Number: 5,428,595
[45] Date of Patent: Jun. 27, 1995

[54] OPTICAL INFORMATION RECORDING AND REPRODUCING DEVICE

[75] Inventors: Yoshio Yoshida, Nara; Hideaki Sato, Yamatokoriyama; Yukio Kurata, Tenri; Hiroyuki Yamamoto, Tenri; Nobuo Ogata, Tenri; Katsuhiro Kubo, Yamatokoriyama, all of Japan

[73] Assignee: Sharp Kabushiki Kaisha, Osaka, Japan

[21] Appl. No.: 9,911

[22] Filed: Jan. 27, 1993

[30] Foreign Application Priority Data

Jan. 28, 1992 [JP] Japan ................................. 4-013395

[51] Int. Cl.⁶ .............................................. G11B 17/32
[52] U.S. Cl. .................................... 369/109; 369/44.23
[58] Field of Search ............... 364/44.23, 44.24, 44.37, 364/44.41, 103, 109; 359/563, 30

[56] References Cited

U.S. PATENT DOCUMENTS

| | | | |
|---|---|---|---|
| 4,817,074 | 3/1989 | Yamanaka | 369/46 |
| 5,049,732 | 9/1991 | Nagahama et al. | 369/44.37 |
| 5,111,449 | 5/1992 | Kurata et al. | 369/44.37 |
| 5,115,423 | 5/1992 | Maeda et al. | 369/112 |
| 5,130,877 | 7/1992 | Hsie et al. | 360/126 |
| 5,253,237 | 10/1993 | Miyake et al. | 369/44.37 |
| 5,283,690 | 2/1994 | Miyake et al. | 359/566 |
| 5,283,772 | 2/1994 | Miyake et al. | 369/44.23 |

FOREIGN PATENT DOCUMENTS

| | | |
|---|---|---|
| 0311463 | 4/1989 | European Pat. Off. . |
| 0315744 | 5/1989 | European Pat. Off. . |
| 2205678 | 12/1988 | United Kingdom . |

OTHER PUBLICATIONS

Microoptics News, Hodic Circular, The Japan Society of Applied Physics, May 26, 1989, vol. 7, No. 2.
CD Pickup Using a Holographic Optical Element, The Japanese Society of Precision Engineering (JSPE)-5-6-10 '90-10-1775.

*Primary Examiner*—Paul M. Dzierzynski
*Assistant Examiner*—Don Wong
*Attorney, Agent, or Firm*—David G. Conlin; George W. Neuner

[57] ABSTRACT

An optical information recording and reproducing device is provided. The device includes a light source for emitting a light beam, a first diffraction element for splitting the light beam into at least three diffracted beams, an optical system guiding the diffracted beams to a recording medium, and a second diffraction element including at least one division line and a diffraction surface from which the diffracted beams are diffracted. The diffraction surface is divided into at least two regions by the division line or lines. One of the division lines is at a predetermined angle against the direction of a track on the recording medium, and the regions split each of the diffracted beams into at least two parts to diffract the parts in different directions. The device also includes an optical detecting element for detecting the light beams diffracted with the second diffraction element.

4 Claims, 13 Drawing Sheets

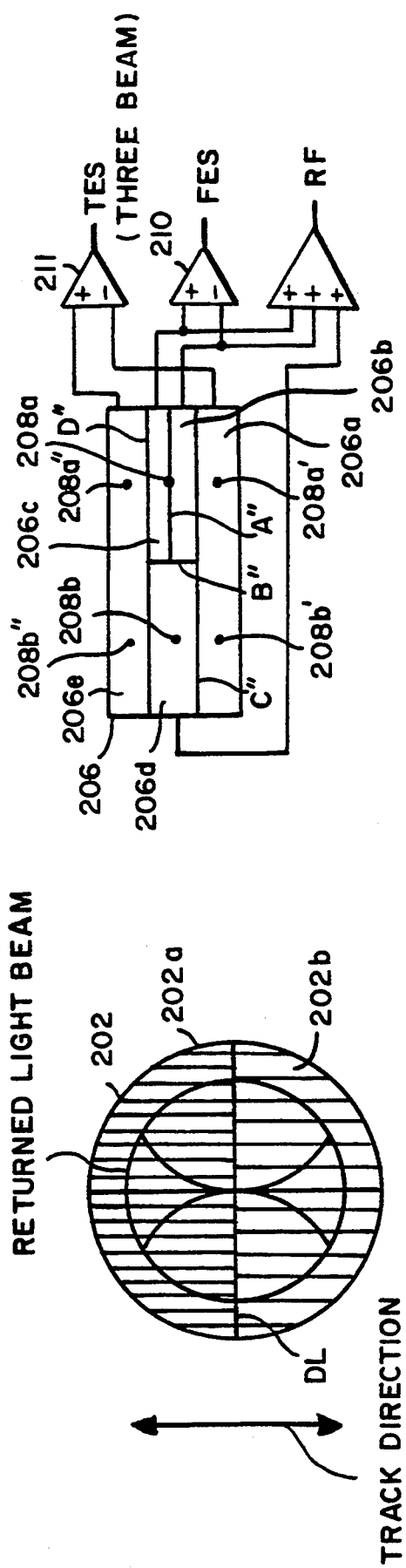

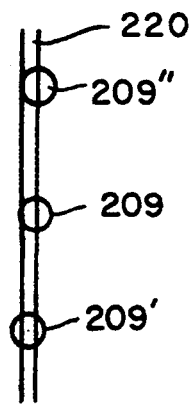 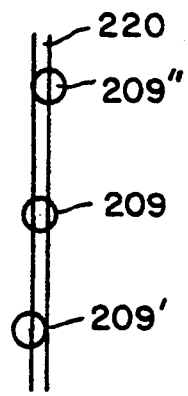 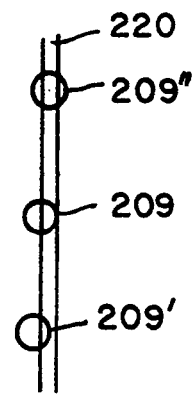
FIG.14A    FIG.14B    FIG.14C
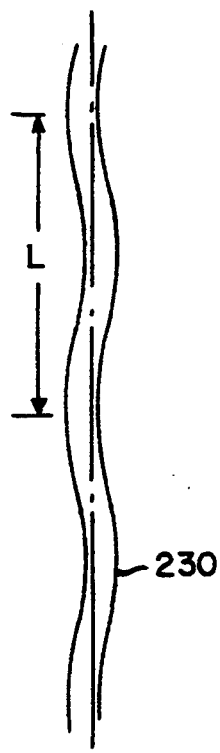
FIG.15
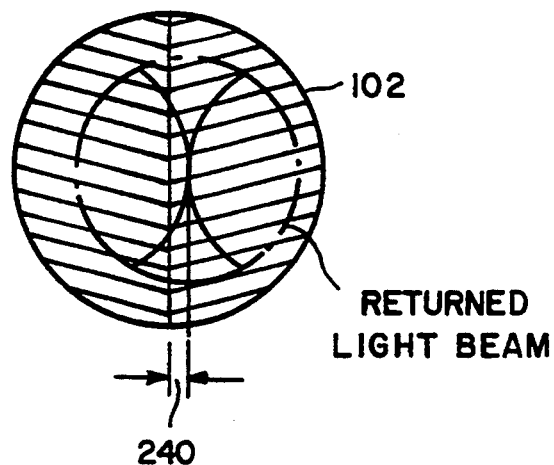
FIG.16

OPTICAL INFORMATION RECORDING AND REPRODUCING DEVICE

BACKGROUND OF THE INVENTION

1. Field of the Invention

The present invention relates to an optical information recording and reproducing device such as an optical pickup suitably used for a compact disk reproducing unit and the like. More particularly, the present invention relates to an optical information recording and reproducing device having a detecting system for generating servo signals.

2. Description of the Related Art

An optical disk can store a huge amount of information with high density. In recent years, the applications for such an optical disk have been developed in various fields. The optical disk can be classified into a rewritable type, a write once type, and a reproduction only type depending on the erasability of recording pits formed thereon. An optical information recording and reproducing device is used to record information on such an optical disk and to reproduce information recorded thereon. Such a device can be classified into a phase change type, a reflectance change type, etc. depending on the method of forming recording pits on the optical disk. Generally, in the optical information recording and reproducing device, a recording medium such as the optical disk has a guide groove corresponding to a recording track previously formed thereon so as to allow light beams to trace the guide groove under tracking control when information is recorded, reproduced, or erased on or from the recording medium.

In the tracking control, a tracking error is conventionally detected mainly by two methods: a one-beam "push-pull method" and a "three-beam method".

First, referring to FIGS. 7 to 10, the one-beam push-pull method will be described. In this method, a light beam used for both recording and reproduction is radiated onto a track on an optical disk as the recording medium. The light beam reflected from or passing through the optical disk is used as detecting light. The detecting light is introduced to a diffraction element having two areas divided by a division line running parallel to the direction of the track on the optical disk (hereinafter referred to as the "track direction"). The light beams diffracted from the two areas are separately inspected by an optical detector, where the difference of light amounts is detected as a tracking error.

FIG. 7 shows a conventional optical pickup using the one-beam push-pull method for detecting a tracking error. Referring to FIG. 7, a light beam (divergent light) emitted from a semiconductor laser 101 passes through a diffraction element 102 and is converged on an optical disk 105 through a collimator lens 103 and an objective lens 104. The light beam reflected from the optical disk 105 returns through the objective lens 104 and the collimator lens 103 and is diffracted with the diffraction element 102 so as to be converged on an optical detector 106.

Then, a focusing error detection mechanism and a tracking error detection mechanism of this optical pickup using the one-beam pull-push method will be described.

FIGS. 8A and 8B show the details of the diffraction element 102 and the optical detector 106, respectively. These figures also show the relative positions to each other of the diffraction element 102 and the optical detector 106 as seen from top.

First, the focusing error detection mechanism will be described. As is shown in FIG. 8A, the diffraction element 102 is substantially circular and has two semicircular regions 102a and 102b divided by a division line PL. As is shown in FIG. 8B, the optical detector 106 has four detecting portions 106a, 106b, 106c, and 106d divided by division lines A', B', and C'. One part of the returned light beam incident to and diffracted from the region 102a of the diffraction element 102 is converged on the division line A' as a converged area 108a, and the other part incident to and diffracted from the region 102b is converged on the division line C' as a converged area 108b.

In the above-described configuration, when the light beam emitted from the semiconductor laser 101 is accurately converged on a spot on the optical disk 105 through the objective lens 104, the converged areas 108a and 108b are formed as spots right on the division lines A' and C', respectively, as is shown in FIG. 9B. As a result, the light amounts on the detecting portions 106a and 106b and the light amounts on the detecting portions 106c and 106d are equal to each other, respectively.

On the other hand, in cases where the optical disk 105 is moved closer to the objective lens 104 due to some cause, the focal points of the diffracted beams are formed behind the optical detector 106. As a result, as is shown in FIG. 9C, the converged areas 108a and 108b are formed not on the division lines A' and C' as a focal point, but on the detecting portions 106a and 106b in a semicircular shape, respectively.

In cases where the optical disk 105 is moved farther from the objective lens 104 due to some cause, the focal points of the diffracted beams are formed in front of the optical detector 106. As a result, as is shown in FIG. 9A, the converged areas 108a and 108b are formed not on the division lines A' and C' as a focal point, but on the detecting portions 106a and 106b in a semicircular shape, respectively.

Thus, a focusing error signal FES output from the optical detector 106 is obtained by calculating the following equation:

$$FES = (S1 + S4) - (S2 + S3) \qquad (1)$$

wherein S1, S2, S3, and S4 are output signals from the detecting portions 106a, 106b, 106c, and 106d of the optical detector 106, respectively. The calculation is performed with adders 110a and 110b and a subtractor 111 as is shown in FIG. 8B.

Next, the tracking error detection mechanism will be described. FIGS. 10A to 10C respectively show the relative positions to each other of a converged spot 109 on the optical disk 105 and an information track (pit array) 120, together with the intensity distribution of the returned light beam. As is shown in FIG. 10B, the intensity distribution of the returned light beam is symmetrical with regard to the track direction when the converged spot 109 is right on the information track 120.

On the other hand, as is shown in FIG. 10C, in cases where the information track 120 is shifted to left with regard to the converged spot 109 due to some cause, the right portion of the returned light beam (hatched portion) is dark, while the left portion thereof is bright. Likewise, as is shown in FIG. 10A, in cases where the information track 120 is shifted to the right with regard to the converged spot 109, the left portion of the returned light beam (hatched portion) is dark, while the right portion thereof is bright.

As is shown in FIG. 8A, the returned light beam is split into two beams in accordance with the regions 102a and 102b of the diffraction element 102, and the division line PL thereof is parallel to the track direction. Thus, a tracking error signal TES output from the optical detector 106 is obtained as the difference of the light amounts of the converged areas 108a and 108b, which is obtained by calculating the following equation:

$$TES = (S1+S2) - (S3+S4) \qquad (2)$$

wherein S1, S2, S3, and S4 are output signals as defined earlier. The calculation is performed with adders 112a and 112b and a subtracter 113 as is shown in FIG. 8B.

Thus, based on the focusing error signal FES and the tracing error signal TES obtained as described above as servo signals, the objective lens 104 is properly driven with an actuator (not shown) so that the converged spot 109 can be placed right on the information track 120.

Next, referring to FIGS. 11 to 14, the three-beam method will be described. In this method, a light beam is split into a main beam and two sub-beams by means of a diffraction element, and any tracking error is detected using the sub-beams.

FIG. 11 shows a conventional optical pickup using the three-beam method. Referring to FIG. 11, a light beam emitted from a semiconductor laser 201 is introduced into a first diffraction element 207 where the incident light beam is split into a zero-order diffracted beam (main beam) and first-order diffracted beams (sub-beams) for detecting any tracking error. The three diffracted beams pass through a second diffraction element 202, and are converged on an optical disk 205 through a collimator lens 203 and an objective lens 204. The light beams reflected from the optical disk 205 return through the objective lens 204 and the collimator lens 203 and are diffracted with the second diffraction element 202 so as to be converged on an optical detector 206.

Then, the focusing error detection mechanism of the optical pickup using the three-beam method will be described.

FIGS. 12A and 12B show the details of the second diffraction element 202 and the optical detector 206, respectively. These figures also show the relative positions to each other of the second diffraction element 202 and the optical detector 206 as seen from top.

As is shown in FIG. 12A, the second diffraction element 202 is substantially circular and has two semicircular regions 202a and 202b divided by a division line DL. As is shown in FIG. 12B, the optical detector 206 has five detecting portions 206a, 206b, 206c, 206d, and 206e divided by division lines A", B", C", and D".

One part of the returned main beam incident to and diffracted from the region 202a of the second diffraction element 202 is converged on the division line A" as a converged area 208a, and the other part incident to and diffracted from the region 202b is converged on the detecting portion 206d as a converged area 208b, as is shown in FIG. 12B. On the other hand, one of the returned sub-beams forms converged areas 208a' and 208b' on the detecting portion 206a. Likewise, the other returned sub-beam forms converged areas 208a" and 208b" on the detecting portion 206e.

In the above-described configuration, when the light beam emitted from the semiconductor laser 201 is accurately converged on a spot on the optical disk 205 through the objective lens 204, the converged area 208a is formed as a spot right on the division line A", as is shown in FIG. 13B. As a result, the light amounts on the detecting portions 206b and 206c are equal to each other.

On the other hand, in cases where the optical disk 205 is moved closer to the objective lens 204 due to some cause, the focal points of the diffracted beams are formed behind the optical detector 206. As a result, as is shown in FIG. 13A, the converged area 208a is formed not on the division line A" as a focal point, but on the detecting portion 206b in a semicircular shape.

In cases where the optical disk 205 is moved farther from the objective lens 204 due to some cause, the focal points of the diffracted beams are formed in front of the optical detector 206. As a result, as is shown in FIG. 13C, the converged area 208a is not formed on the division line A" as a focal point, but on the detecting portion 206c in a semicircular shape.

Thus, the focusing error signal FES output from the optical detector 206 is obtained by calculating the following equation:

$$FES = S2 - S3 \qquad (3)$$

wherein S2 and S3 are output signals from the detecting portions 206b and 206c of the optical detector 206, respectively. The calculation is performed with an adder 210 as is shown in FIG. 12B.

Next, the tracking error detection mechanism will be described. FIGS. 14A to 14C respectively show the relative positions of converged spots 209, 209', and 209" on the optical disk 205 and an information track 220. As is shown in FIG. 14B, the converged spots 209' and 209" formed by the sub-beams are located apart the same distance away from the converged spot 209 formed by the main beam in the opposite directions to each other along the information track 220. Further, the converged spots 209' and 209" are slightly shifted with regard to the information track 220 in the opposite directions to each other.

In cases where the information track 220 is shifted to left with regard to the converged spot 209 due to some cause, as is shown in FIG. 14A, the converged spot 209' is located substantially right on the information track 220. This results in that the intensity of the reflected light beam from the converged spot 209' decreases. At this time, the converged spot 209" is further shifted from the information track 220, so that the intensity of the reflected light from the converged spot 209" increases. Likewise, in cases where the information track 220 is shifted to right with regard to the converged spot 209, the converged spots 209' and 209" are shifted in reverse as is shown in FIG. 14C. This results in that the intensity of the reflected light from the converged spot 209' increases and that of the reflected light from the converged spot 209" decreases.

As described earlier, the sub-beams reflected from the converged spots 209' and 209" are converged on the detecting portions 206a and 206e of the optical detector 206. Accordingly, the tracking error signal TES is obtained by calculating the following equation:

$$TES = S1 - S5 \qquad (4)$$

wherein S1 and S5 are output signals from the detecting portions 206a and 206e. The calculation is performed with a subtracter 211 as is shown in FIG. 12B.

Thus, based on the focusing error signal FES and the tracking error signal TES obtained as described above as servo signals, the objective lens 204 is properly driven with an actuator (not shown) so that the converged spot 209 be placed right on the information track 220.

The above-described three-beam method can provide stable focusing and tracking detection without being affected by the inclination of the optical disk 205 nor the depths of pits and a guide groove thereof. Accordingly, this method is mainly employed for an optical pickup used for an optical disk of the reproduction only type.

However, both of the above methods have a problem when applied to an optical pickup capable of recording on and/or reproducing from three types of compact disks (CDs), i.e., the rewritable type, the write once type, and the reproduction only type.

The problem arises because an optical disk has a constant linear velocity. In the reproduction only type optical disk, the recording information thereof includes information for velocity control, so that the rotational velocity of the optical disk can be controlled upon the start of the reproduction. However, in the rewritable type or write only type optical disk, no information is recorded thereon at an initial recording, so that velocity control as above is not possible.

To overcome the above problem, a guide groove is provided for the rewritable type and write once type optical disks, as is shown in FIG. 15, and such a guide groove 230 is wobbled at a predetermined period. Thus, the linear velocity of the optical disk is kept constant by detecting the periodic wobbling. Based on the standard for the CDs in which the linear velocity is 1.2–1.4 m/sec. and the frequency of the wobbling is 22.1 kHz, period L of the wobbling of the guide groove 230 is 54–63 $\mu$m.

In order to detect the wobbling with high sensitivity by an optical pickup using the three-beam method, the distance between the two converged spots of the sub-beams should be L×N (N is an integer). When the above value for L is used, the distance is approximately 60 $\mu$m, 120 $\mu$m, . . . . Because of the restriction in the optical design, the distance is limited to 60 $\mu$m, thus preventing the optical pickup from being designed freely. Further, to improve the performance of the tracking, the distance should be as small as possible. At present, it is designed to be approximately 30–40 $\mu$m. Moreover, because of the restriction in the arrangement of the converged areas formed on the optical detector 206, most preferably, the division line on the second diffraction element 202 should be vertical to the track direction. This has been applied in the actual design. This restriction is inevitable for all optical pickups using a diffraction element for splitting a light beam into a main beam and sub-beams.

For the above-described reasons, the three-beam method is disadvantageous in application to the optical pickup used for the rewritable type and the write once type optical disks, thus limiting the application thereof to an optical pickup used for the reproduction only type optical disk.

On the other hand, the one-beam push-pull method is free from the restriction in the arrangement of the converged areas formed on the optical detector. Further, in general, the one-beam push-pull method can detect the wobbling with higher sensitivity than the three-beam method. However, according to the one-beam push-pull method, when the objective lens moves in the radial direction of the optical disk, the returned light beam is introduced to the diffraction element 102 with an offset 240 from the center division line as is shown in FIG. 16. Further, the one-beam push-pull method is easily affected by any inclination of the optical disk. Thus, the one-beam push-pull method is disadvantageous in the points which are advantageous for the three-beam method.

Because of the above-described reasons, there has not been realized an optical information recording and reproducing device capable of recording on and/or reproducing from the optical disks of the rewritable type, the write once type, and the reproduction only type using either of the one-beam push-pull method or the three-beam method.

SUMMARY OF THE INVENTION

The optical information recording and reproducing device of this invention includes a light source for emitting a light beam, a first diffraction element for splitting the light beam into at least three diffracted beams, an optical system guiding the diffracted beams to a recording medium, and a second diffraction element including at least one division line and a diffraction surface from which the diffracted beams are diffracted. The diffraction surface is divided into at least two regions by the division line or lines. One of the division lines is at a predetermined angle against the direction of a track on the recording medium, and the regions split each of the diffracted beams into at least two parts to diffract the parts in different directions. The device also includes an optical detecting element for detecting the light beams diffracted with the second diffraction element.

According to the optical information recording and reproducing device of the present invention, the second diffraction element is divided into at least two regions by a division line having a predetermined angle against the direction of the track of the recording medium. The light beams diffracted from these regions are detected with the optical detector.

The focusing error signal FES is obtained by a differential detection of the main beam with the optical detector. The tracking error signal TES based on the conventional three-beam method is obtained by a differential detection of the sub-beams with the optical detector. Further, according to the present invention, since the diffracted beams include a component of light in the direction vertical to the track direction, the tracking error signal TES which can be obtained by using the one-beam push-pull method (hereinafter referred to as the "TES based on the push-pull method") can also be obtained.

Thus, the invention described herein makes possible the advantage of providing an optical information recording and reproducing device in which tracking control can be performed based on both the one-beam push-pull method and the three-beam method so as to realize recording on and/or reproduction from all the optical disks of the rewritable type, the write once type, and the reproduction only type by one device.

This and other advantages of the present invention will become apparent to those skilled in the art upon reading and understanding the following detailed description with reference to the accompanying figures.

BRIEF DESCRIPTION OF THE DRAWINGS

FIGS. 12A and 12B are top views showing the relative positions to each other of a diffraction element and an optical detector for the optical pickup of FIG. 11.

FIGS. 14A to 14C show the principle for detecting a tracking error in the optical pickup of FIG. 11.

FIG. 15 shows a guide groove formed on an optical disk.

FIG. 16 shows an offset produced on the diffraction element when the one-beam push-pull method is used.

DESCRIPTION OF THE PREFERRED EMBODIMENTS

EXAMPLE 1

Figure 1:
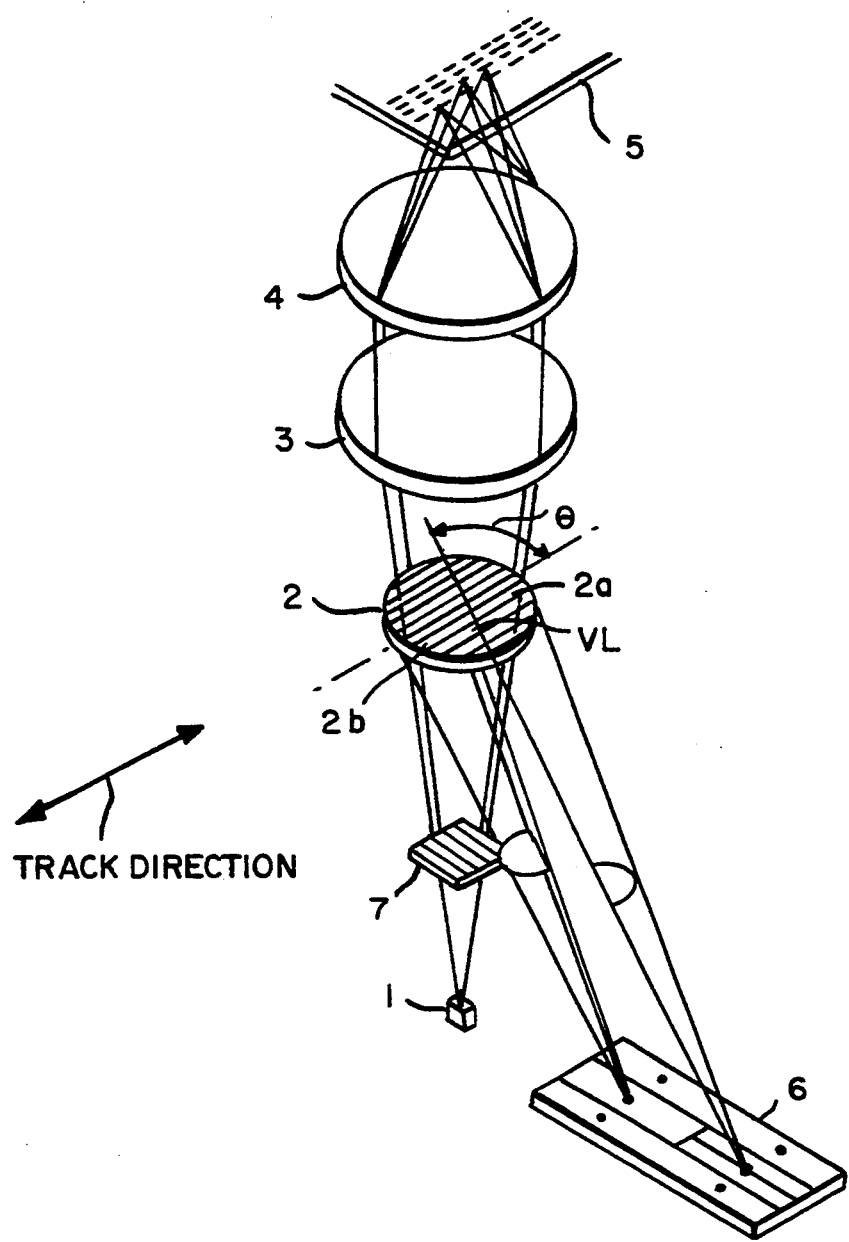
FIG. 1 is a perspective view of an optical pickup according to the present invention.

FIG. 1 shows an optical pickup as an example of the optical information recording and reproducing device according to the present invention.

Referring to FIG. 1, the optical pickup according to the present invention includes an optical system disposed under an optical disk 5 for converging a light beam on the optical disk 5. The configuration and operation of the optical system will be described as follows:

A light beam (divergent light) emitted upward from a semiconductor laser 1 is introduced into a first diffraction element 7, where the incident light beam is split into a zero-order diffracted beam (main beam) and first-order diffracted beams (sub-beams) for detecting a tracking error. The three diffracted beams pass through a second diffraction element 2 disposed above the first diffraction element 7, and are converted into parallel light beams with a collimator lens 3. The parallel light beams are then converged respectively on the optical disk 5 with an objective lens 4 disposed above the collimator lens 3.

The light beams reflected from the optical disk 5 return through the objective lens 4 and the collimator lens 3 and are diffracted with the second diffraction element 2. The diffracted beams are then detected by an optical detector 6 disposed on the side of the semiconductor laser 1.

Then, the focusing error detection mechanism of this example will be described.

Figure 2A:
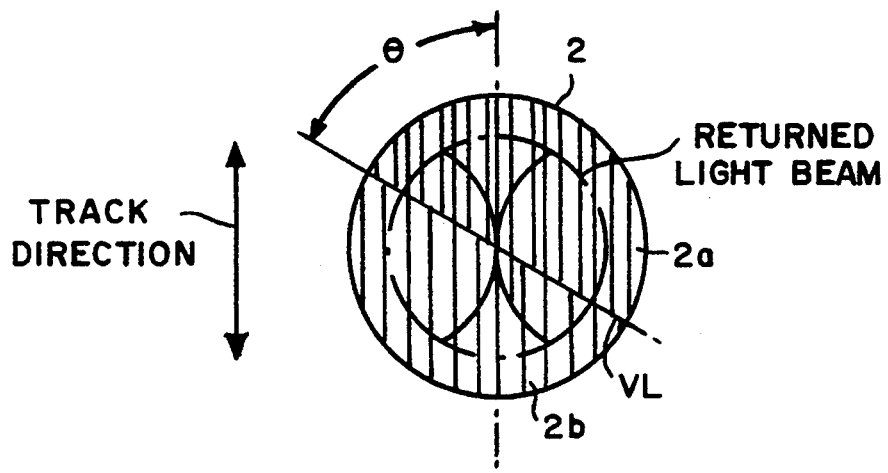
FIGS. 2A and 2B are top views showing the relative positions to each other of a diffraction element and an optical detector for the optical pickup of FIG. 1 according to the present invention.

As is shown in FIG. 2A, the second diffraction element 2 is substantially circular and has two semicircular regions 2a and 2b divided by a division line VL. The second diffraction element 2 of this example is different from the second diffraction element 202 shown in FIG. 11 in the following point: though the second diffraction element 202 is divided into the regions 202a and 202b by the division line DL vertical to the track direction, the diffraction element 2 is divided into the regions 2a and 2b by the division line VL inclined by angle $\theta$ against the track direction.

Figure 2B:
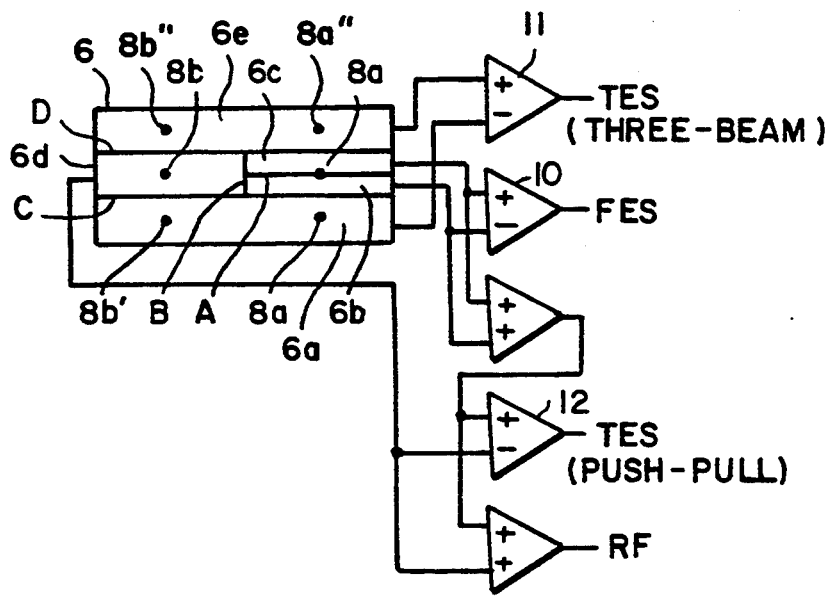

As is shown in FIG. 2B, the optical detector 6 has five detecting portions 6a, 6b, 6c, 6d, and 6e divided by division lines A, B, C, and D.

One part of the returned main beam incident to and diffracted from the region 2a of the second diffraction element 2 is converged on the division line A as a converged area 8a, and the other part incident to and diffracted from the region 2b is converged on the detecting portion 6d as a converged area 8b, as is shown in FIG. 2B. On the other hand, one of the returned sub-beams forms converged areas 8a' and 8b' on the detecting portion 6a. Likewise, the other returned sub-beam forms converged areas 8a'' and 8b'' on the detecting portion 6e.

As is seen from the above description, the focusing error detection mechanism of this example is the same as the conventional mechanism based on the three-beam method, except that the directions of the division lines against the tracking direction are different. Accordingly, the focusing error signal FES can be obtained by detecting the light amounts of the detecting portions 6b and 6c and calculating the difference therebetween as is done according to the equation (3) described earlier, which is performed with a subtracter 10 as is shown in FIG. 2B.

The tracking error detection mechanism of this example is the same as the conventional mechanism based on the three-beam method. Accordingly, the tracking error signal TES can be obtained by detecting the light amounts of the detecting portions 6a and 6e and calculating the difference therebetween as is done according to equation (4) described earlier, which is performed with a subtracter 11 as is shown in FIG. 2B.

In addition to the tracking detection based on the three-beam method, according to this example, the tracking error detection based on the one-beam push-pull method is also possible. This is because the division line VL of this example is inclined by angle $\theta$ against the track direction.

Figure 11:
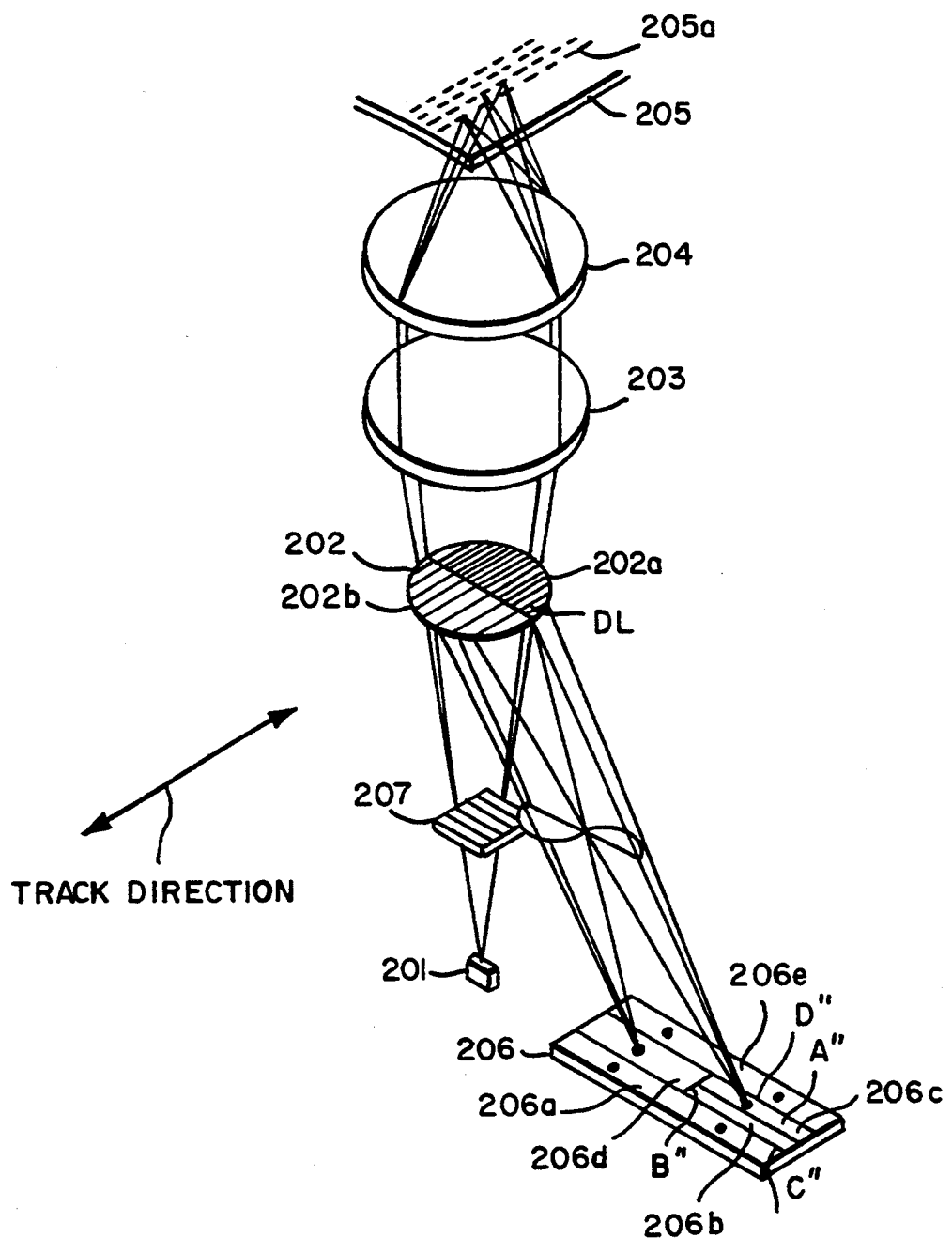
FIG. 11 is a perspective view of a conventional optical pickup using the three-beam method.
Figure 13A:
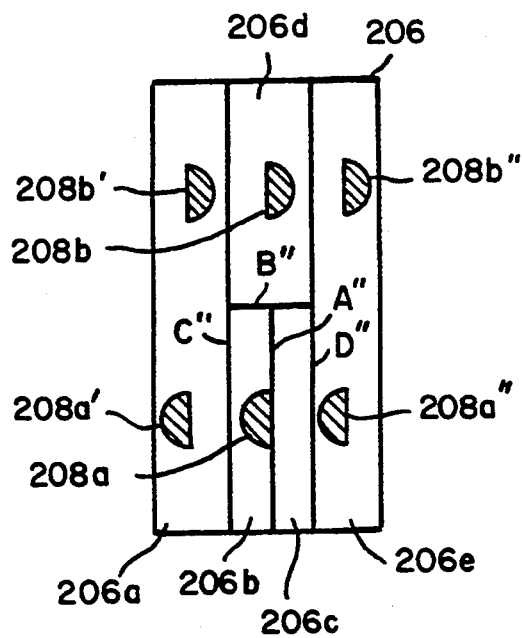
FIGS. 13A to 13C show the principle for detecting a focusing error in the optical pickup of FIG. 11.
Figure 13B:
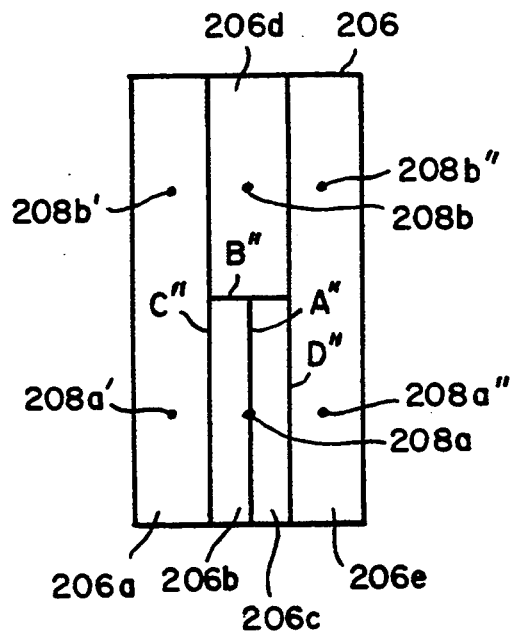
Figure 13C:
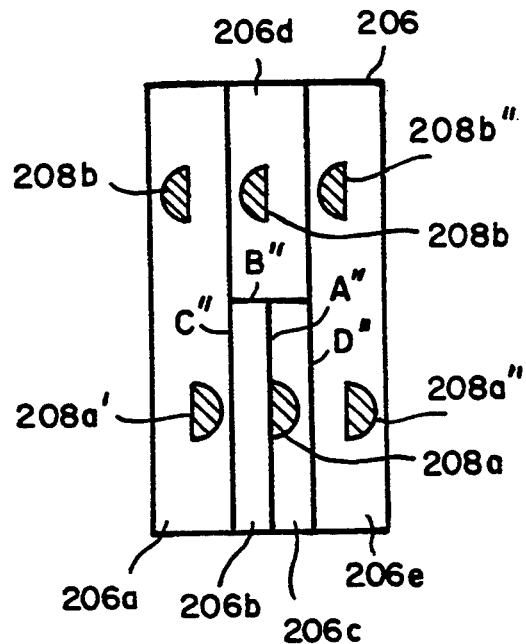

That is, according to the conventional optical pickup using the three-beam method as is shown in FIG. 11, since the division line DL is vertical to the track direction, a component of light in the direction vertical to the track direction can not be captured with the second diffraction element 202. Thus, it is not possible to provide a TES based on the push-pull method. On the other hand, according to this example, since the division line VL is inclined by angle θ against the track direction, it is possible to capture the component in the direction vertical to the track direction with the second diffraction element 2, thus making it possible to provide the TES based on the push-pull method.

More specifically, as is shown in FIG. 2B, the optical detector 6 has the division line B parallel to the track direction. Therefore, the light amount of the detecting portion 6d which is on one side of the division line B is subtracted from the sum of the light amounts of the detecting portions 6b and 6c which constitute the other side of the division line B to obtain the TES based on the push-pull method. This calculation is practically performed with a subtracter 12 shown in FIG. 2B.

As described above, according to the optical pickup of this example, the tracking detection based on both the three-beam method and the one-beam push-pull method is possible. As a result, according to this example, recording on and/or reproduction from the optical disks of the rewritable type, the write once type, and the reproduction only type can be performed by a single optical pickup.

EXAMPLE 2

Figure 3:
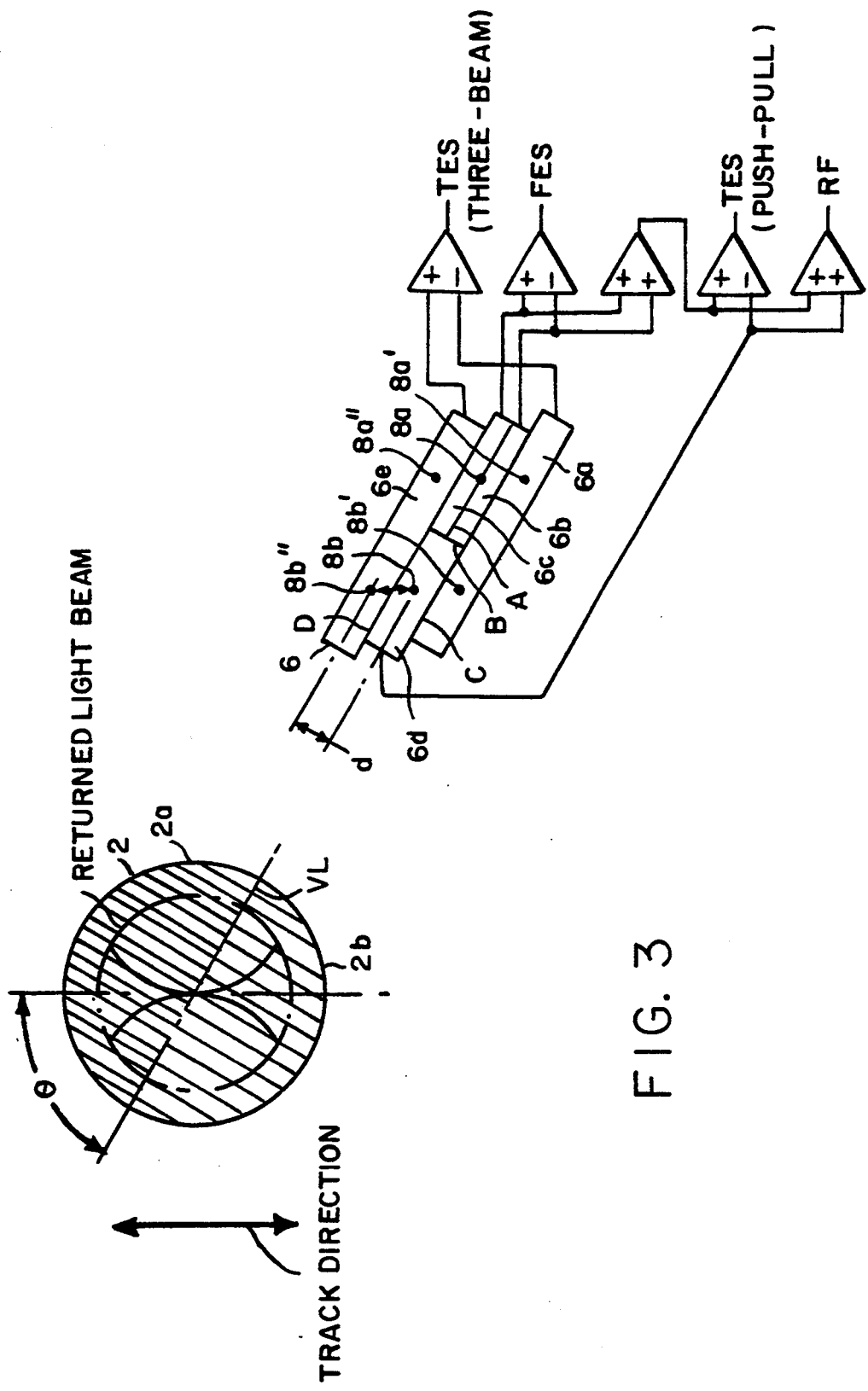
FIG. 3 is a top view showing the relative positions to each other of a diffraction element and an optical detector for another optical pickup according to the present invention.

FIG. 3 shows an optical pickup of this example. This example is the same as Example 1, except that the directions of the diffraction of the returned light are different. In this example, the returned light is diffracted in a direction vertical to the division line VL, while in Example 1, the returned light is diffracted in a direction oblique to the division line VL. According to the optical pickup of this example, the same effect as in Example 1 can be obtained. Like components are denoted by like reference numerals, and the description thereof is omitted.

Figure 4:
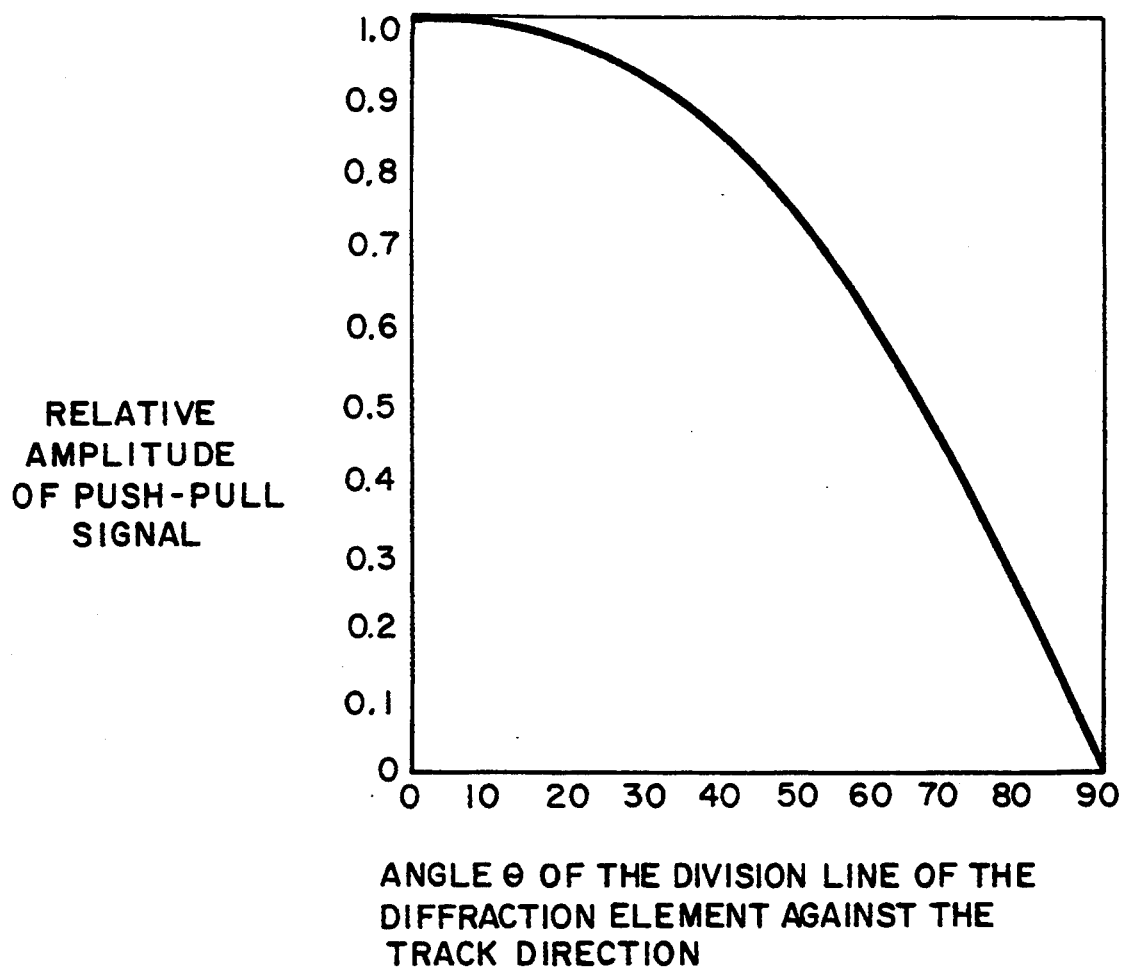
FIG. 4 shows an dependency of the relative amplitude of a TES based on the push-pull method upon angle $\theta$ of the division line of a diffraction element against the track direction.

For the preceding examples, angle θ of the division line VL against the track direction is preferably 20°–80° due to the reason stated below:

First, as is shown in FIG. 4, the relative amplitude of a TES based on the push-pull method depends upon angle θ. As angle θ is made closer to 90°, the amplitude drastically drops. However, when angle θ is 80° or less, the amplitude can be more than 20% of that obtained when angle θ is 0°. This level of reduction of the amplitude can be easily compensated by the amplification or other means in an electrical circuit in a later stage. Accordingly, it is preferable to set angle θ to 80° or less.

Secondly, in Example 1, as angle θ is closer to 0°, the detectability of the focusing error signal FES lowers. This is because components of light symmetrical with regard to the line vertical to the track direction are canceled with each other in obtaining the FES. While the detectability of the FES when angle θ is 90° is 1.0, the relative detectability of the FES at angle θ is 2θ/180. Therefore, when θ is 20°, the detectability of the FES is 20% of that when θ is 90°. This level of reduction of the detectability can be easily compensated by using an amplifier or the like.

On the other hand, in Example 2, when angle θ decreases, distance d between the diffracted main light beam and the diffracted sub-beams decreases. The relation between distance d and angle θ is $d = l \times \sin \theta$ wherein l is the distance between the converged areas of the diffracted main beam and the converged areas of the diffracted sub-beams. Distance l is limited to approximately 60 μm due to the restriction in the design of other optical systems. Further, it is difficult in practice to set the width of each of the detecting portions 6a, 6b, 6c, 6d, and 6e to 17 μm or less, so that distance d should be 17 μm or more. Under the above conditions, angle θ should be 16.5° or more. Accordingly, it is preferable to set angle θ to 20° or more.

Due to the above two reasons, according to the present invention, angle θ is preferably 20°–80°.

EXAMPLE 3

Figure 5:
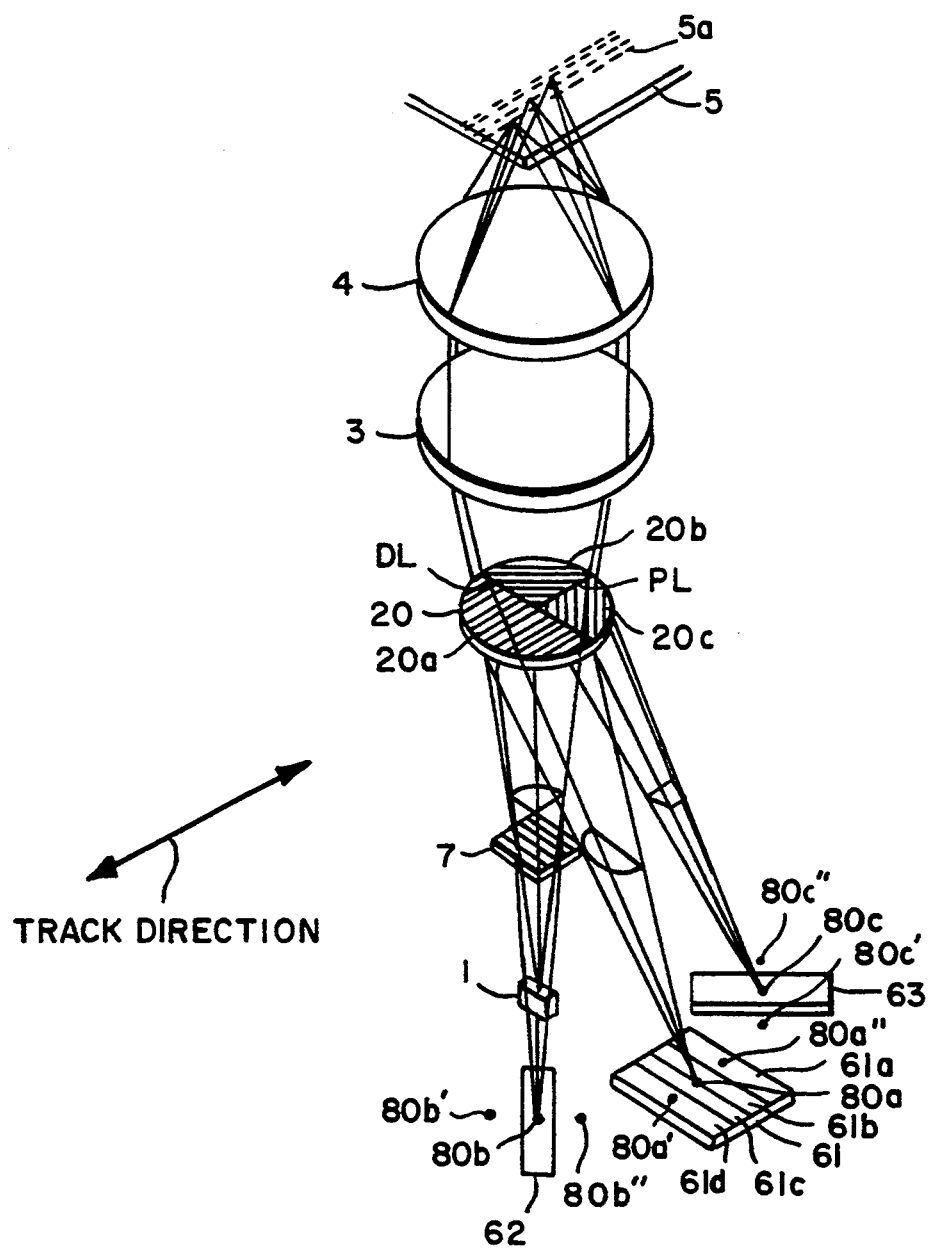
FIG. 5 is a perspective view of still another optical pickup according to the present invention.

FIG. 5 shows an optical pickup of this example. In this example, a second diffraction element is divided into three regions, and three optical detectors are disposed for detecting the light beams diffracted in three different directions from the three regions of the second diffraction element. Other configurations and operations of the optical pickup of this example are the same as those in Examples 1 and 2. Like components are denoted by like reference numerals.

A light beam (divergent light) emitted upward from the semiconductor laser 1 is introduced into the first diffraction element 7, where the incident light beam is split into a zero-order diffracted beam (main beam) and first-order diffracted beams (sub-beams). The three diffracted beams pass through a second diffraction element 20 disposed above the first diffraction element 7, and are converted into parallel light beams by the collimator lens 3. The parallel light beams are then converged respectively on the optical disk 5 with the objective lens 4 disposed above the collimator lens 3.

The light beams reflected from the optical disk 5 return through the objective lens 4 and the collimator lens 3 and are introduced to the second diffraction element 20. The second diffraction element 20 is divided into two parts by the division line DL vertical to the track direction of the optical disk 5. One part is a region 20a, and the other part is further divided into two parts by the division line PL parallel to the track direction to form a region 20b and a region 20c. These three regions 20a, 20b, and 20c have different diffraction directions from one another.

Thus, the returned light beams introduced to the second diffraction element 20 are respectively diffracted in three different directions from the above three regions 20a, 20b, and 20c. The diffracted beams are then detected by three optical detectors 61, 62, and 63 disposed on the side of the semiconductor laser 1, respectively.

Then, the focusing error detection mechanism of this example will be described.

Figure 6:
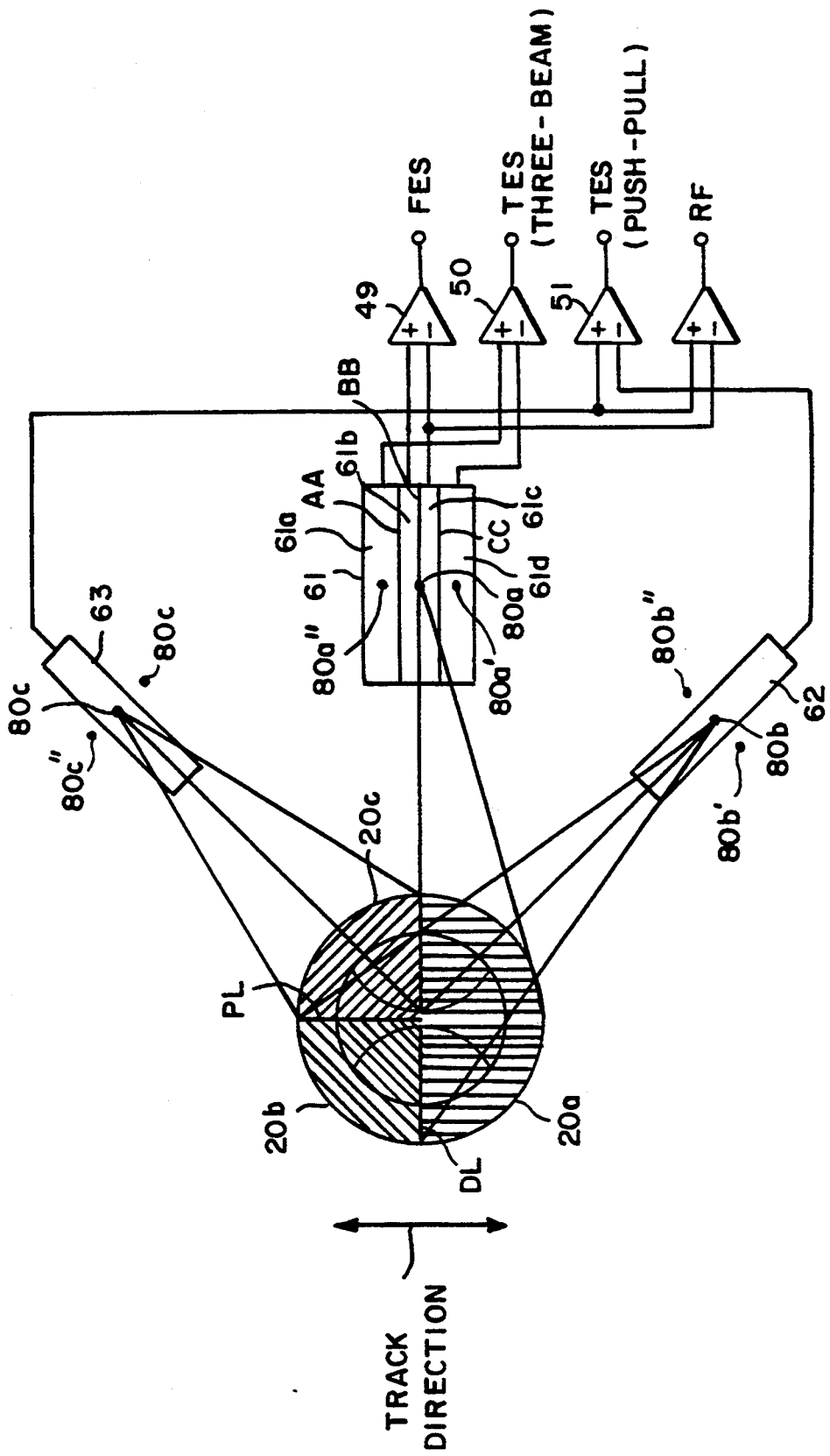
FIG. 6 is a top view showing the relative positions to each other of a diffraction element and an optical detector for the optical pickup of FIG. 5 according to the present invention.

FIG. 6 shows the relative positions of the second diffraction element 20 and the optical detectors 61, 62, and 63 as seen from top. As is shown in FIG. 6, the second diffraction element 20 is substantially circular and has the semicircular region 20a formed by the division line DL. The other half divided by the division line DL is further divided to form the two quadrantal regions 20b and 20c.

Figure 7:
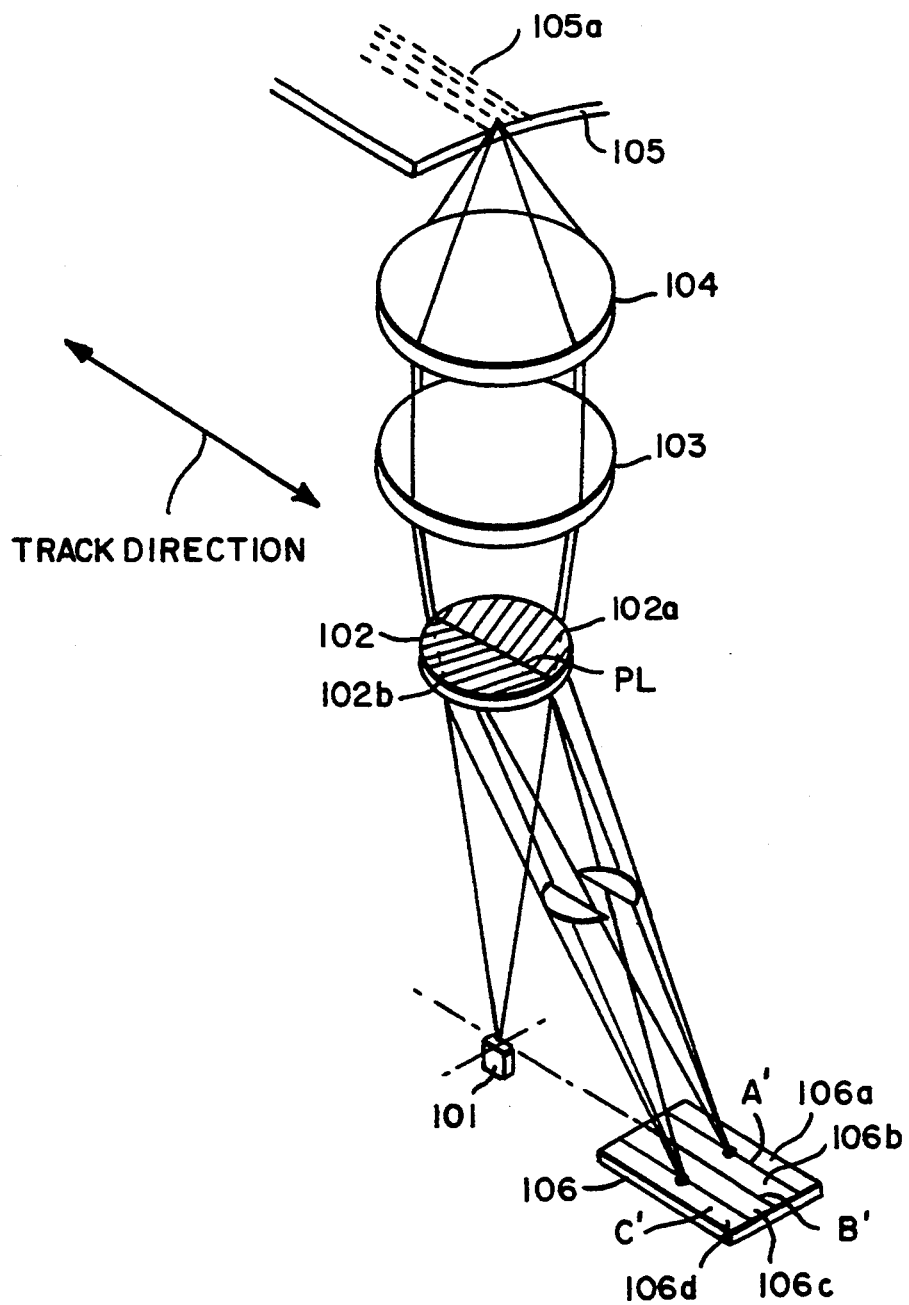
FIG. 7 is a perspective view of a conventional optical pickup using the one-beam push-pull method.
Figure 8A:
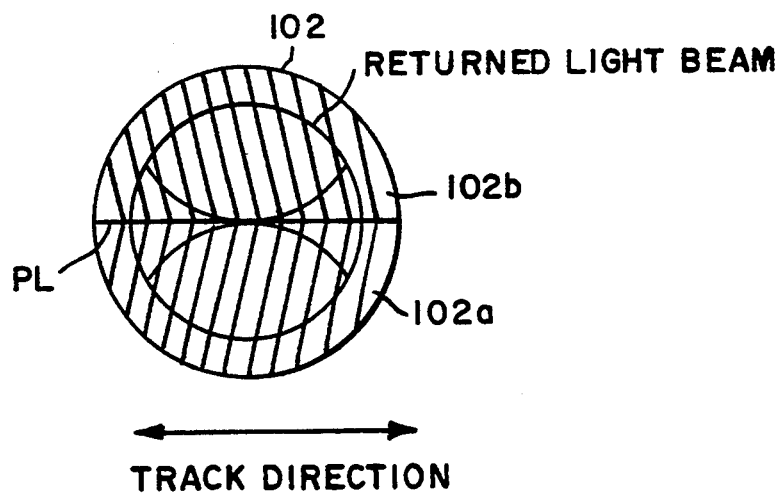
FIGS. 8A and 8B are top views showing the relative positions to each other of a diffraction element and an optical detector for the optical pickup of FIG. 7.
Figure 8B:
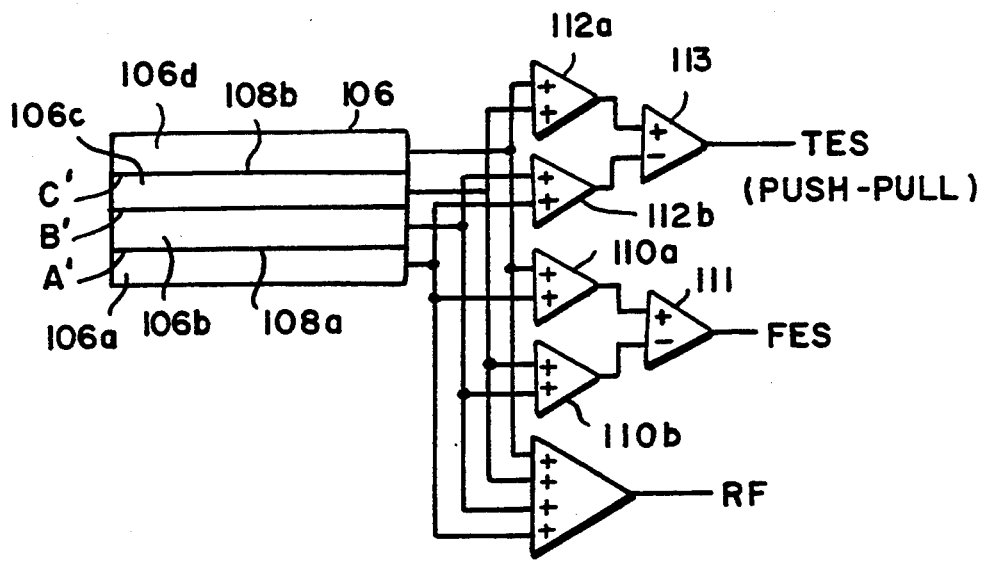
Figures 9A, 9B, 9C:
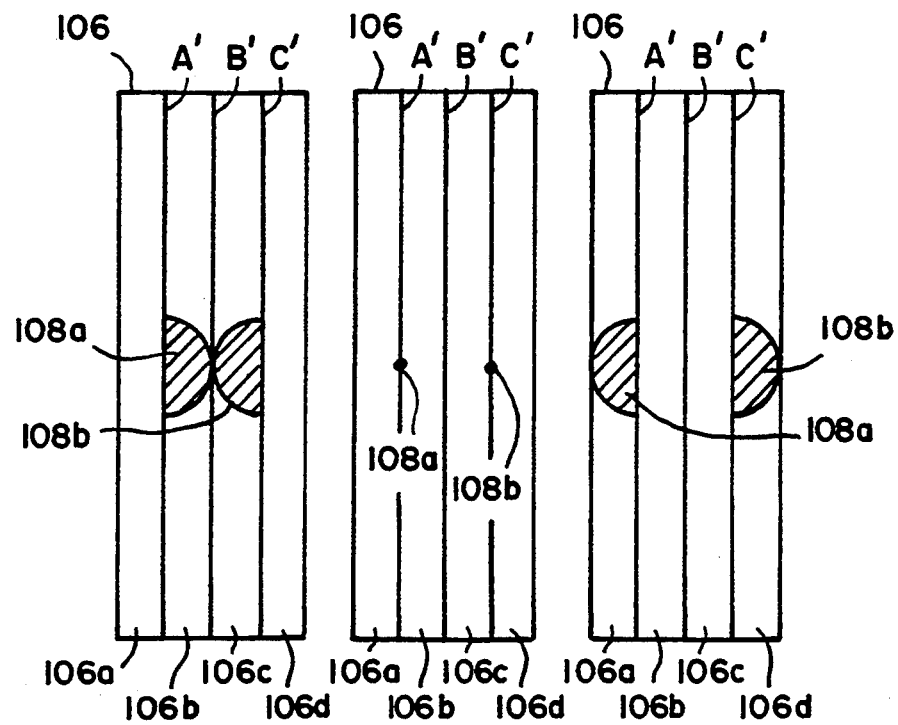
FIGS. 9A to 9C show the principle for detecting a focusing error in the optical pickup of FIG. 7.
Figures 10A, 10B, 10C:
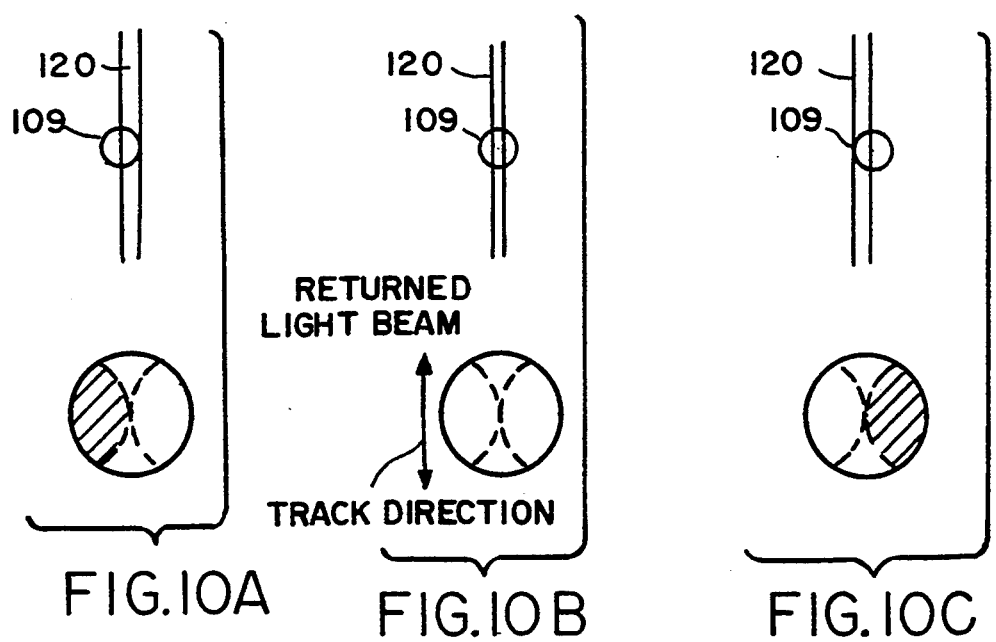
FIGS. 10A to 10C show the principle for detecting a tracking error in the optical pickup of FIG. 7.

The second diffraction element 20 of this example is different from the diffraction element 102 shown in FIG. 7 and the second diffraction element 202 shown in FIG. 11 in the following point. The diffraction element 102 is divided into the regions 102a and 102b by the division line PL parallel to the track direction, and the light beams diffracted from the regions 102a and 102b are received by the optical detector 106. The second diffraction element 202 is divided into the regions 202a and 202b by the division line DL vertical to the track direction, and the light beams diffracted from the regions 202a and 202b are received by the optical detector 206.

In this example, however, as described above, the second diffraction element 20 is divided into three regions 20a, 20b, and 20c by the division lines PL and DL, and the light beams diffracted from these three regions are received by the three optical detectors 61, 62, and 63.

According to the optical pickup of this example, a first part of the returned main beam incident to and diffracted from the semicircular region 20a of the second diffraction element 20 is converged on a division line BB of the optical detector 61 as a converged area 80a. A second part of the returned main beam incident to and diffracted from the quadrantal region 20b is converged on the optical detector 62 as a converged area 80b, and the other part of the returned main beam incident to and diffracted from the quadrantal region 20c is converged on the optical detector 63 as a converged area 80c.

On the other hand, first parts of the returned sub-beams incident to and diffracted from the semicircular region 20a of the second diffraction element 20 are converged on detecting portions 61d and 61a of the optical detector 61 as converged areas 80a' and 80a", respectively. Second parts of the returned sub-beams incident to and diffracted from the quadrantal region 20b are converged on both sides of the optical detector 62 as converged areas 80b' and 80b", and the other parts of the returned sub-beams incident to and diffracted from the quadrantal region 20c are converged on both sides of the optical detector 63 as converged areas 80c' and 80c".

As is seen from the above description, the focusing error detection mechanism of this example is the same as those of the preceding examples and the conventional mechanism based on the three-beam method, except for the number of the regions formed on the second diffraction element 20. Accordingly, the focusing error signal FES can be obtained by using the first part of the main beam diffracted from the semicircular region 20a and converged on the optical detector 61 as the converging area 80a and detecting the light amounts of the detecting portions 61b and 61c. The difference between the detected light amounts are then calculated as is done according to the equation (3) described earlier with a subtracter 49 as is shown in FIG. 6.

As for the tracking error detection mechanism of this example, the tracking error signal TES based on the three-beam method can be obtained by using the first parts of the sub-beams diffracted from the semicircular region 20a and converged on the detecting portions 61d and 61a as the converging areas 80a' and 80a" and detecting the light amounts of the detecting portions 61d and 61a. The difference of the detected light amounts are then calculated as is done according to the equation (4) described earlier with a subtracter 50 as is shown in FIG. 6.

Moreover, according to this example, the TES based on the push-pull method can also be obtained by using the parts of the main beam diffracted from the quadrantal regions 20b and 20c divided by the division line PL parallel to the track direction and converged on the optical detectors 62 and 63 as the converging areas 80b and 80c and detecting the light amounts of the optical detectors 62 and 63. The difference of the detected light amounts are then calculated as described above with a subtracter 51 as is shown in FIG. 6.

As described above, according to the optical pickup of this example, the tracking detection based on both the three-beam method and the one-beam push-pull method is possible. As a result, according to this example, recording on and/or reproduction from the optical disks of the rewritable type, the write once type, and the reproduction only type can be performed by a single optical pickup.

In Examples 1 and 2, in order to minimize the decrease of the relative amplitude of the TES based on the push-pull method, the angle $\theta$ of the division line of the diffraction element against the track direction is set in the range of 20°–80°. In this example, however, since the division line PL is parallel to the track direction, the relative amplitude of the TES based on the push-pull method does not decrease. Further, since the reflected light beams from the optical disk 5 are split symmetrically by the division lines of the second diffraction element 20, problems such as crosstalk between error signals and inaccuracy of the focusing error signal FES are prevented.

In this example, as is shown in FIGS. 5 and 6, the sub-beams diffracted from the quadrantal regions 20b and 20c of the second diffraction element 20 are not received by the optical detectors 62 and 63, but are converged outside thereof as the converged areas 80b' and 80b" and the converged areas 80c' and 80c", respectively. However, it is also possible to dispose optical detectors having a width large enough to receive these diffracted beams so as to utilize them for obtaining a signal based on the three-beam method.

In this example, the directions of light beams diffracted from the areas 20a, 20b, and 20c of the second diffraction element 20 are set to be apart by 45° as is shown in FIGS. 5 and 6. However, the angle between the directions can be in any degree to effect the differential detection as described above, unless the converged areas 80a' and 80b" and the converged areas 80a" and 80c' overlap with each other, respectively.

Further, the optical pickup of this example includes three optical detectors 61, 62, and 63 disposed separately. However, these optical detectors can be mounted on a single semiconductor substrate, for example.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording and reproducing device comprising:
   means for emitting a light beam;
   first diffraction means for splitting said light beam into at least three diffracted beams;
   an optical system guiding said at least three diffracted beams to a recording medium;
   second diffraction means including a diffraction surface from which said at least three diffracted beams are diffracted, said diffraction surface being divided into at least two regions by said at least one imaginary division line, one of said at least one imaginary division line being at a predetermined angle against the direction of a track on said recording medium, said at least two regions diffracting said at least three diffracted beams in different directions; and optical detecting means for detecting said at least three diffracted beams diffracted with said second diffraction means, wherein said predetermined angle is within a range from 20° to 80°.

2. An optical information recording and reproducing device according to claim 1, wherein said at least three diffracted beams are a zero-order diffracted beams and a pair of first-order diffracted beams.

3. An optical information recording and reproducing device according to claim 1, wherein said diffraction surface has gratings formed thereon, said gratings are formed so as to diffract said at least three diffracted beams in a direction oblique to said one of said at least one imaginary division line.

4. An optical information recording and reproducing device according to claim 1, wherein said diffraction surface has gratings formed thereon, said gratings are formed so as to diffract said at least three diffracted beams in a direction vertical to said one of said at least one imaginary division line.

* * * * *